United States Patent [19]

Muehlberger

[11] 4,371,563
[45] Feb. 1, 1983

[54] FINE PARTICLE FILTER SYSTEM HAVING LOW PRESSURE DROP FOR GASEOUS FLOW SYSTEMS

[75] Inventor: Erich Muehlberger, San Clemente, Calif.

[73] Assignee: Electro-Plasma, Inc., Irvine, Calif.

[21] Appl. No.: 277,020

[22] Filed: Jun. 24, 1981

Related U.S. Application Data

[63] Continuation of Ser. No. 134,526, Mar. 27, 1980, abandoned.

[51] Int. Cl.³ .............................................. B05D 1/08
[52] U.S. Cl. ................................. 427/34; 427/345; 219/121 PL; 55/90; 55/95; 55/248; 55/257 QV; 261/119 R; 55/446
[58] Field of Search ............... 55/90, 95, 248, 257 QV, 55/257 NP, 274, 446; 98/115 SB; 261/119 R; 219/121 P, 121 PA, 121 PL; 118/DIG. 7, 326, 61; 427/34, 345

[56] References Cited

U.S. PATENT DOCUMENTS

| | | | |
|---|---|---|---|
| 164,652 | 6/1875 | Mason | 55/445 |
| 520,675 | 5/1894 | Gindele | 55/444 |
| 1,903,731 | 4/1933 | Gaston | 55/445 |
| 2,379,795 | 7/1945 | Fenn | 55/249 |
| 2,625,383 | 1/1953 | Baird | 261/119 R |
| 3,048,039 | 8/1962 | Hackler | 55/444 |
| 3,350,322 | 10/1967 | Waterhouse | 261/119 R |
| 3,527,026 | 9/1970 | Miura | 55/239 |
| 3,668,825 | 6/1972 | McIlvaine | 55/93 |
| 3,764,272 | 10/1973 | Sterling | 219/121 P |
| 3,932,151 | 1/1976 | Lau | 98/115 SB |

*Primary Examiner*—Bernard Nozick
*Attorney, Agent, or Firm*—Fraser and Bogucki

[57] ABSTRACT

An overspray filter collector unit for a plasma spray system filters fine, relatively small particulate from the overspray upstream of the vacuum pumps. The filter collector unit includes a hollow tank having a pool of oil at the bottom thereof having a top surface onto which the overspray is directed from an inlet conduit. Some of the particulate matter is deposited in the oil and at the same time oil droplets and vapor are entrained in the overspray as it deflects from the oil surface into a tortuous path defined by a plurality of baffles within the tank. The baffle surfaces are wetted by the oil vapor and droplets, and the resulting oil coating entraps the remaining particulate in the overspray before the overspray exits via an outlet conduit to the vacuum pumps. The oil on the surfaces of the baffles with the entrapped particulate therein continuously drains via gravity to the pool of oil at the bottom of the tank and is replaced by oil at the surface of the pool entrained into the continuous flow of overspray. When the accumulation of particulate in the oil is such that the oil rises to a predetermined level, the oil is drained and replaced with fresh oil.

15 Claims, 7 Drawing Figures

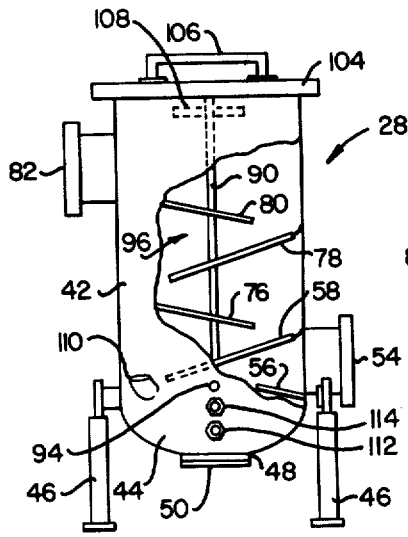
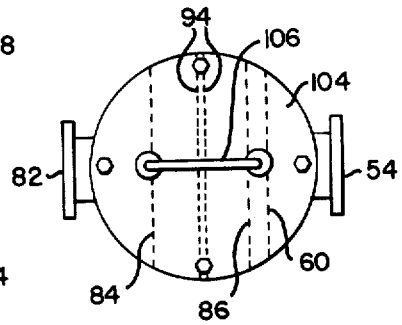
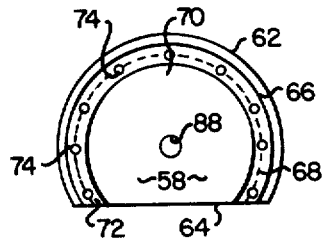
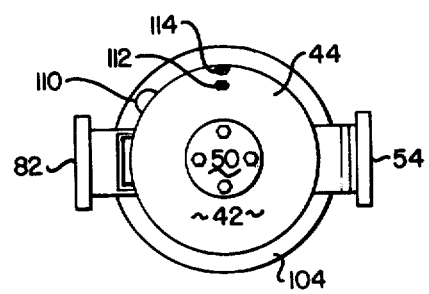
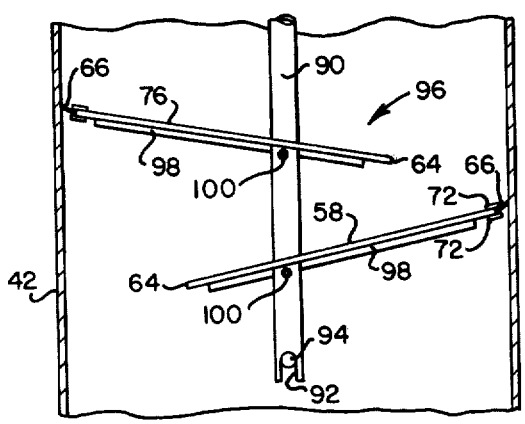
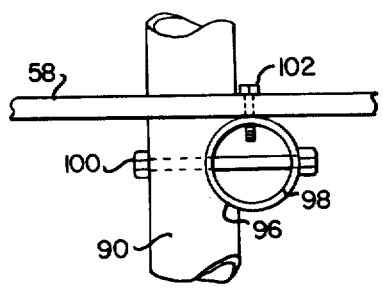

4,371,563

FINE PARTICLE FILTER SYSTEM HAVING LOW PRESSURE DROP FOR GASEOUS FLOW SYSTEMS

This is a continuation of application Ser. No. 134,526 filed Mar. 27, 1980 now abandoned.

BACKGROUND OF THE INVENTION

In plasma spray technology, modern systems often utilize a supersonic plasma jet operating in a low pressure enclosed environment, with powder being injected into the plasma jet such that minute molten droplets of metallic or ceramic material are caused to be coated with a highly adherent, temperature resistant layer. A particularly efficient example of such a system is provided in a co-pending application of Muehlberger et al entitled "System And Method For Plasma Coating", filed Nov. 26, 1979, Ser. No. 97,723 now U.S. Pat. No. 4,328,257 issued May 4, 1982 and assigned to the assignee of the present application. As described in that system, vacuum pumps coupled to an output conduit from the plasma spray chamber are arranged to draw and maintain a selected low pressure despite the supersonic flow of a high velocity ionized gas together with any shielding gases that may be used. The overspray that does not impinge on and adhere to the workpiece is drawn by the vacuum pump through an outlet conduit that includes a primary filter that eliminates particle matter in excess of a particular size, such as three microns. The generation of large quantities of this minute particulate is inherent in the plasma spraying process, but fundamentally incompatible with the operation of most high efficiency vacuum pumps. If the particulate is not removed from the outlet flow stream prior to entering the vacuum pump, its internal elements become coated and corroded, and in practice have failed catastrophically at an excessively high rate.

A simplistic solution to this problem is to utilize a filter, some types of which are referred to as "absolute filters," having extremely small openings and distorted flow paths, such that particulate of measurable size cannot penetrate. However, these filters interpose a significant pressure drop within the system, and in fact create problems of equal magnitude. The type of vacuum pump which will draw down to a sufficiently low pressure level cannot maintain the desired interior pressure in the system without being excessively large in size and using excessive amounts of power. A need therefore exists for an overspray filter and collector that introduces a low pressure drop into the system but that can efficiently remove substantially all particulate of below a specified size range.

SUMMARY OF THE INVENTION

Systems and methods in accordance with the invention direct an outlet gas flow in which fine particulate is entrained onto the surface of an oil pool or sump at the bottom of a chamber defined by the inside of a hollow tank in which are successively disposed a number of oppositely directed, downwardly sloping baffle elements, leading to an outlet conduit at the upper end of the chamber. In impinging directly upon the surface of the oil sump, the gases create a turbulent cloud of oil vapor and droplets, while also causing some of the entrained particulate to be captured within the oil sump and to descend to the bottom. The gas flow within the entrained particulate and oil follows a tortuous path upward against gravity around the openings adjacent the free end of each of the oppositely directed baffles, carrying oil throughout the chamber to wet the baffle surfaces on both sides. Multiple stagnation regions of gaseous eddies and flows are established throughout the tortuous path, and the particulate matter, which is of small size but substantially greater mass than the gas flow, inevitably encounters an oil laden surface in its upward progression. An equilibrium of oil transport and particulate collection is established, in which gravity flow of the oil causes it to flow downward to the oil sump, carrying particulate with it, while newly entering gases continually redistribute oil from the sump throughout the system. The oil vapor molecules appearing at the outlet end of the system are fully compatible with the lubricating oil system in the vacuum pump, and an equilibrium is established here as well, such that no significant reduction in pump life can be noted. The openings between baffles and chamber wall in the system are sufficiently large that no discernible pressure drop can be noted within the collector unit.

In accordance with the invention, a specific example of a system employs a unitary, removable baffle structure having a center support on which the individual baffle members are spatially disposed. Each of the baffle members includes a resilient peripheral lip member for registering with the facing wall of the chamber, thus to block flow except at the opposite end of the baffle. The bottom part of the chamber is constructed such that viewing parts permit observation of the level of the oil, which increases with the collection of particulate in the bottom of the chamber, so that it can readily be ascertained when accumulated particulate should be removed from the bottom of the chamber.

Further in accordance with the invention, additional means may be employed for attracting and collecting the particulate material. Thus, electromagnets or permanent magnets may be disposed within portions of the system to provide magnetic attraction for particulates, or electrostatic means may be used to like effect. Further, a separate pump and conduit system in communication with the oil sump may be utilized to pump oil into the system at the top baffle to insure full lubrication under particularly rigorous conditions of operation, although substantially adequate wetting is provided by a separate circulating flow from the top down through the successive baffles.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 2 is a front elevation, partly broken away, of a preferred embodiment of the filter collector unit of FIG. 1;

FIG. 3 is a top view of the filter collector unit of FIG. 2;

FIG. 4 is a bottom view of the filter collector unit of FIG. 2;

FIG. 5 is a plan view of one of the baffles utilized in the filter collector unit of FIG. 2;

FIG. 6 is a side view of a portion of the baffle arrangement in the filter collector unit of FIG. 2; and FIG. 7 is a side view of a portion of the arrangement of FIG. 6.

DETAILED DESCRIPTION

Figure 1:
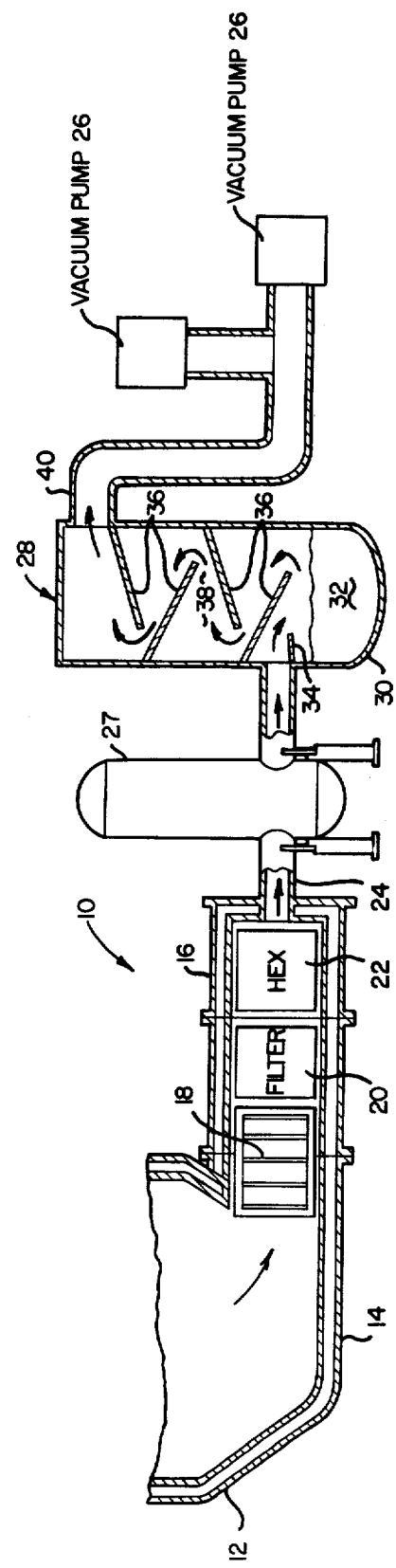
FIG. 1 is a sectional view of a portion of a plasma spray system illustrating an overspray filter collector unit in accordance with the invention.

FIG. 1 depicts a portion of plasma spray system 10. The portion of the system 10 depicted in FIG. 1 includes the bottom part of a plasma chamber 12 formed into a bottom collector cone 14 for collecting overspray from plasma spraying apparatus and a workpiece located upstream thereof. The bottom collector cone 14 leads into and communicates with associated units for processing the overspray comprising exiting gases and particulate while maintaining the desired ambient pressure. Previously referred to co-pending application Ser. No. 97,723 of Muehlberger et al describes such a plasma spray system in greater detail. As pointed out in that application, plasma spray systems of this type are supersonic in nature and provide a plasma stream velocity of Mach 2-3 and in some cases even greater than Mach 3.2.

The collector cone 14 directs the overspray gaseous and particulate materials into a module 16 which includes a water cooled baffle section 18 for initially cooling the overspray, and an in-line filter section 20 for extracting the majority of the entrained particulate matter. Effluent passing through the module 16 is then directed through a heat exchanger module 22, which may be another water cooled unit, and into a vacuum manifold 24. The vacuum manifold 24 couples the output of the heat exchanger module 22 to a pair of vacuum pumps 26 via a filter 27 and an overspray filter collector unit 28. The filter 27 may be of the cloth type and is operative to remove from the overspray substantially all of the remaining large particulate such as that which is greater than 3 microns in size. The filter collector unit 28 must be capable of extracting substantially all of the remaining particulate consisting principally of relatively small, fine particulate from the overspray without introducing a significant pressure differential. The vacuum pumps 26 have sufficient capacity to maintain a desired ambient pressure within the plasma chamber 12 which is typically in the range from 0.6 down to 0.001 atmospheres. As pointed out in the previously referred to co-pending application of Muehlberger et al, the pressure within such systems may typically be maintained at a value of about 0.05 atmospheres.

Prior art plasma spraying systems employ various devices just upstream of the vacuum pumps for filtering fine particulate from the overspray. So-called "absolute filters" which have extremely small openings and distorted flow paths are sometimes used. However, these have been found to introduce a large enough pressure differential so as to drop the pumping capacity of the vacuum pumps significantly. Special filters designed for use in vacuum systems and which are capable of filtering particles as small as 1 micron or less with little pressure differential are sometimes used. However, such filters tend to be very large and cumbersome as well as expensive and usually require a time consuming cleaning or exchanging process.

The overspray filter collector unit 28 in accordance with the invention provides relatively simple and inexpensive apparatus for effectively filtering fine particulate matter from the overspray while at the same time having relatively little effect on the pumping capacity of the vacuum pumps 26. Overspray in the vacuum manifold 24 is directed into an enclosed container 30 at the bottom of which is contained a quantity of oil 32. A flange 34 and a lower baffle 36 direct the entering overspray onto a portion of the surface of the oil 32 in such a way as to entrain oil vapor and droplets into the overspray. At the same time some of the fine particulate in the overspray is deposited within the oil 32. From the surface of the oil 32, the overspray is directed through a tortuous path 38 defined by additional baffles 36 where the oil vapor and droplets are deposited on multiple stagnation regions provided by the surfaces of the baffles 36. The resultant oil wetting the surfaces of the baffles 36 and also the inner walls of the enclosed container 30 entraps the fine particulate from the overspray. The overspray exiting the container 30 at an outlet conduit 40 is free or substantially free of particulate matter which can damage or destroy the vacuum pumps 26 relatively quickly when present in very large quantities. The oil wetting the surfaces within the tortuous path 38 and which includes the fine particulate continuously migrates back to the quantity of oil 32 at the bottom of the container 30 through gravity. The inner walls of the container 30 are generally vertically disposed, and the baffles 36 alternately extend from the opposite inner walls and slope downwardly to encourage the flow of oil back to the bottom of the container 30. In the meantime the oil 32 at the bottom of the container 30 continues to be entrained in the overspray and carried upwardly through the tortuous path 38 for deposit on the surfaces within the path.

Eventually the particulate buildup within the oil 32 is such as to significantly increase the volume of the oil. The level of the oil 32 rises to a point at which the oil is heavily laden with particulate and its ability to continue to entrap particulate effectively begins to diminish. At this point the oil 32 is removed from the container 30 and replaced with fresh oil.

A preferred embodiment of the overspray filter collector unit 28 in accordance with the invention is illustrated in FIGS. 2-7. The enclosed container 30 of the unit 28 comprises a hollow, generally cylindrical tank 42 having a generally rounded bottom 44. The tank 42 is held in an upright position with the central axis thereof generally vertical by opposite support legs 46 mounted on opposite sides of the tank 42. The support legs 46 suspend the rounded bottom 44 of the tank 42 above the ground or other supporting surface for the unit 28 to permit access to a collar 48 mounted on the outside of and communicating with the hollow interior of the tank 42 at the center of the rounded bottom 44. A lower cover plate 50 is normally bolted in place over the collar 48 so as seal off the bottom of the tank 42 and thereby retain a quantity of the oil 32 inside the rounded bottom 44 of the tank 42. The cover plate 50 may be unbolted and removed from the collar 48 to facilitate draining of the oil 32 from the bottom of the tank 42.

Overspray from the vacuum manifold 24 shown in FIG. 1 enters the tank 42 via an inlet conduit 54 mounted on the outside wall of the tank 42 adjacent the rounded bottom 44 of the tank. The inlet conduit 54 communicates with a portion of the inside of the tank 42 mounted on the bottom by a flange 56 corresponding to the flange 34 in FIG. 1 and at the top by a baffle 58 corresponding to the baffle 36 in FIG. 1. The flange 56 which is in the shape of a small portion of a disk has a curved edge conforming with and joined to the inner wall of the tank 42 such as by welding. The flange 56 also has a straight edge which extends across a substantial portion of the inside width of the tank 42 and which is denoted by a dotted line 60 in FIG. 3.

The baffle 58 which is shown in greater detail in FIG. 5 has the shape of a substantial portion of a circular disk and includes a curved edge 62 and a straight edge 64. The curved edge 62 terminates in an edge seal 66 of neoprene or similar material. The edge seal 66 abuts the curved outer edge denoted by a dotted line 68 of a metal plate 70 forming most of the baffle 58. The edge seal 66 is held in place against the outer edge of the metal plate 70 by opposite mounting strips 72 of like configuration. The mounting strips 72 are disposed on opposite sides of the metal plate 70 and the edge seal 66 so as to sandwich the two together and hold them in place. The mounting strips 72 are mounted on the outer periphery of the metal plate 70 by bolts 74 which extend through holes in the mounting strips 72 and in the metal plate 70.

The edge seal 66 of the baffle 58 resides against the inner wall of the tank 42 so as to seal the baffle 58 to the inner wall around the curved edge 62 of the baffle. As shown in FIG. 2 the baffle 58 slopes downwardly from a point at the center of the curved edge 62 to the straight edge 64.

The relative shapes and dispositions of the flange 56 and the baffle 58 are such that overspray entering the inlet conduit 54 is prevented from flowing directly onto the top surface of the oil 32 immediately inside of the tank 42 and instead is directed to a central part of the underside of the baffle 58. Beyond the straight edge 60 of the flange 56, however, the baffle 58 continues to slope downwardly so as to direct the overspray downwardly and onto the top surface of the oil 32. The concentration of the overspray onto a particular part of the oil surface combines with the very high velocity of the overspray to entrain a substantial amount of oil vapor and droplets into the overspray. At the same time a portion of the fine particulate within the overspray is deposited within the oil.

In the embodiment of FIGS. 2-7 the tortuous path 38 of FIG. 1 is defined by the baffle 58 in conjunction with three other baffles 76, 78 and 80 which are virtually identical to the baffle 58 shown in FIG. 5. The baffles 58, 76, 78 and 80 are staggered in height along the vertical central axis of the tank and alternately extend downwardly from the opposite side walls of the tank 42. As in the case of the baffle 58, the baffles 76, 78 and 80 each have an edge seal which seals the curved outer edge thereof to the inner wall of the tank 42. This forces the overspray deflected from the surface of the oil 32 to flow upwardly between the baffles 58 and 76, then between the baffles 76 and 78, then between the baffles 78 and 80 and then over the baffle 80 to an outlet conduit 82 corresponding to the outlet conduit 40 of FIG. 1. The outlet conduit 82 is mounted on the tank 42 adjacent the upper end of the tank and at the opposite side of the tank from the inlet conduit 54. Thus, the baffles 58 and 78 have like disposition relative to the cross-sectional area of the tank 42. The straight edges 64 of the baffles 58 and 78 are represented by a dotted line 84 in FIG. 3. The baffles 76 and 80 also have a similar disposition with respect to the cross-sectional area of the tank 42 with the straight edges 64 thereof being represented by a dotted line 86 shown in FIG. 3.

As shown in FIG. 5 each of the baffles has an aperture 88 therein for receiving a central shaft 90. The central shaft 90 which is shown in FIGS. 2 and 6 is generally vertically disposed so as to extend along the central axis of the tank 42. As shown in FIG. 6 the central shaft 90 has a slot 92 at the bottom end thereof for receiving a rod 94. The rod 94 which extends across the interior of the tank 42 and is joined to the opposite side walls is shown by a pair of dotted lines 94 in FIG. 3 as well as in FIGS. 2 and 6. The rod 94 supports the central shaft 90 and the included baffles 58, 76, 78 and 80 which together with the shaft 90 form a baffle assembly 96.

The manner in which each of the baffles 58, 76, 78 and 80 is mounted on the central shaft 90 is shown in detail in FIGS. 6 and 7. As previously noted the central shaft 90 extends through the aperture 88 in each of the baffles. As shown in FIG. 7 which depicts a portion of the baffle 58, the central shaft 90 has a notch 96 therein immediately below the desired location for each baffle. An elongated, generally circular brace 98 is disposed so as to reside within the notch 96 as well as along the underside of the baffle. The brace 98 is secured to the central shaft 90 by a bolt 100. Each baffle such as the baffle 58 shown in FIG. 7 is fastened to the brace 98 by screws 102.

Although substantially all of the particulate deposited on the oil wetted surfaces of the baffles 58, 76, 78 and 80 is deposited in the body of the oil 32 at the bottom of the tank 42 due to the gravity flow of the oil, in time a sludge of particulate or other deposits may form on the surfaces of the baffles. Because of this and the general desirability of providing access to the interior and the bottom of the tank 42, the baffle assembly 96 is made removable. The edge seals 66 at the outer peripheries of the baffles which seal the baffles to the inner side walls of the tank 42 are flexible so as to permit upward and downward movement of the baffle assembly 96 within the tank 42. Access to the top of the tank 42 for purposes of removing the baffle assembly 96 is gained by unbolting and removing an upper cover plate 104 from the top end of the tank 42. The upper cover plate 104 is equipped with a handle 106 to facilitate removal of the cover plate. With the upper cover plate 104 removed, a handle 108 in the form of a crosspiece coupled to the top of the central shaft 90 and which is shown in dotted outline in FIG. 2 may be grasped and the baffle assembly 96 pulled upwardly and out of the tank 42. The removed baffle assembly 96 may be soaked in solvent or otherwise treated to clean it and remove the sludge and deposits on the surfaces of the baffles. The baffle assembly 96 is reinstalled in the tank 42 by lowering the assembly within the tank until the rod 94 is engaged within the slot 92 at the bottom end of the central shaft 90. With the baffle assembly 96 so positioned, the various baffles 58, 76, 78 and 80 are again sealed to the inner side walls of the tank 42 by the flexible, resilient edge seals 66. The upper cover plate 104 is then reinstalled to close off the upper end of the tank 42.

The oil 32 forming the oil pool or sump at the bottom of the tank 42 is added to the bottom of the tank 42 via an oil filler cap 110 built into a lower portion of the side wall of the tank 42 as shown in FIG. 2. Initially, oil is poured into the filler cap 110 until the level thereof reaches a lower viewing port in the form of a sight glass 112. The sight glass 112 defines a minimum nominal oil level for operation of the filter collector unit 28. During use of the unit 28 increasing amounts of particulate are deposited in the oil 32, causing the level of the oil within the tank 42 to rise. A second viewing port in the form of a sight glass 114 located at a selected level above the first sight glass 112 defines a maximum, predetermined level for the oil 32. When the top of the oil 32 reaches the sight glass 114, the lower cover plate 50 is removed from the bottom of the tank 42 to drain the oil from the tank. The cover plate 50 is then replaced, whereupon fresh oil is poured into the bottom of the tank 42 via the oil filler cap 110. The oil used to replenish the supply thereof within the tank 42 may be unused oil or it may be vacuum pump oil which has been used in the pumps 26 but which is still clean enough for use within the filter collector unit 28.

As previously described the overspray entering the filter collector unit 28 entrains oil vapor and droplets from the surface of the oil so as to wet the surfaces of the baffles as the overspray travels upwardly through the tortuous path 38 to the outlet conduit 82. For most applications of the filter collector unit 28 the overspray has sufficient force and velocity so as to continually wet the baffle surfaces with an adequate amount of oil. However, where the supply of oil to the baffle surfaces is considered inadequate, other means can be employed to assist in circulating oil from the bottom of the tank 42 to the baffle surfaces. For example, a pump (not shown) can be coupled to the bottom of the tank 42 so as to continuously or intermittently pump oil from the bottom to the top of the tank 42 for distribution by gravity feed, spray nozzles or other appropriate means on the surfaces of the baffles. Adherence of the particulate to the oil wetting the surfaces of the baffles can be improved for certain applications by various different means. One such means is to affix magnets (not shown) to the surfaces of the baffles. The particulate which is normally electrically charged is attracted to such magnets so as to enhance the deposition of such particulate within the oil wetting the baffle surfaces. Alternatively, the baffles themselves can be electrostatically charged to enhance attraction of the particulate thereto and thereby adherence of the particulate to the oil wetting the surfaces thereof.

While the invention has been particularly shown and described with reference to a preferred embodiment thereof, it will be understood by those skilled in the art that various changes in form and details may be made therein without departing from the spirit and scope of the invention.

What is claimed is:

1. The method of separating a fine particulate from a gaseous flow stream comprising the steps of:
   providing a gaseous flow stream having a fine particulate;
   directing the gaseous flow stream onto the surface of an oil bath at a supersonic speed and in an environment having a pressure no greater than 0.6 atmospheres to introduce oil vapor and droplets into the flow stream and at the same time deposit some of the fine particulate in the oil bath; and
   directing the flow stream containing particulate and oil vapor and droplets through a tortuous path having multiple stagnation regions such that the oil wets surfaces of the multiple stagnation regions along the path and the particulate is adherent to the oil that wets the surfaces when impinging thereon.

2. The method as set forth in claim 1 above, wherein the gaseous flow stream is directed at a speed of at least Mach 2 and the oil bath is disposed at the lower end of the tortuous path which extends upwardly therefrom, and further including the step of providing a gravity flow of oil and adherent particulate from the multiple stagnation regions to the oil bath.

3. The method of filtering fine particulate from overspray in a supersonic plasma coating system comprising the steps of:
   providing supersonic plasma overspray having fine particulate therein;
   directing the overspray onto the surface of a quantity of oil at a speed of at least Mach 2 and in an environment having a pressure no greater than 0.6 atmospheres to trap some of the fine particulate in the oil and at the same time entrain vapor and droplets of oil in the overspray;
   directing the overspray from the surface of the oil through a region having a plurality of different surfaces; and
   providing for coating of the different surfaces with oil, the oil coating receiving and entrapping the fine particulate from the overspray.

4. The method as set forth in claim 3 above, comprising the further step of providing for migration of the oil coating the different surfaces to the quantity of oil.

5. The method as set forth in claim 4 above, comprising the further steps of monitoring the level of the quantity of oil and replacing the quantity of oil when the level thereof exceeds a maximum permissible value.

6. An arrangement for separating a fine particulate from a supersonic gaseous flow stream comprising:
   means for providing a supersonic gaseous flow stream having a fine particulate;
   an inlet conduit for receiving the supersonic gaseous flow stream;
   a container coupled to the inlet conduit and arranged to dispose a surface of a liquid in the container in the path of the gaseous flow stream received by the inlet conduit;
   means defining a tortuous path for the gaseous flow stream and having a plurality of surface areas therein, the path having a first end disposed within the container and an opposite second end;
   an outlet conduit coupled to the second end of the means defining the tortuous path; and
   means coupled to the outlet conduit for establishing a pressure of 0.6–0.001 atmospheres in the container.

7. The invention as set forth in claim 6, wherein the means defining a tortuous path comprises a plurality of baffles mounted within the container and alternately extending from opposite inner walls of the container.

8. The invention as set forth in claim 7, wherein the inlet conduit is coupled to the container below the plurality of baffles, the outlet conduit is coupled to the container adjacent the top one of the plurality of baffles and the means for establishing a pressure includes means for providing the supersonic gaseous flow stream to the inlet conduit at a speed of at least Mach 2.

9. An arrangement for filtering fine particulate from overspray in a supersonic plasma coating system comprising:
   a housing having a generally vertically disposed central axis and a hollow interior;
   a body of oil contained at the bottom of the hollow interior of the housing;
   an inlet conduit communicating with the hollow interior of the housing adjacent the surface of the body of oil;
   means for providing overspray to the inlet conduit at a speed of at least Mach 2;
   an outlet conduit communicating with the hollow interior of the housing adjacent the top of the housing;
   means for establishing a pressure of no greater than about 0.05 atmospheres in the housing; and a plurality of baffles alternately extending from opposite walls of the hollow interior of the housing from different heights to define a tortuous path between the surface of the body of oil and the outlet conduit.

10. The invention as set forth in claim 9, further comprising a first sight glass mounted within the side wall of the housing at a nominal level for the body of oil and a second sight glass mounted within the side wall of the housing above the first sight glass and at a maximum level for the body of oil.

11. The invention as set forth in claim 9, wherein a portion of the hollow interior of the housing is generally cylindrical in shape and each of the baffles is in the shape of a substantial portion of a circular disk and slopes downwardly from the wall of the hollow interior of the housing.

12. The invention as set forth in claim 11, further comprising a shaft extending downwardly along the vertically disposed central axis within the hollow interior of the housing and having the baffles mounted thereon and resilient means disposed about a portion of the outer periphery of each baffle to form a flexible seal with the walls of the hollow interior of the housing.

13. The invention as set forth in claim 12, further comprising a different elongated brace coupled to the underside of each baffle and mounted on the shaft.

14. An overspray filter and collector for particulate of relatively small size in the path of a vacuum pumping system, comprising:

a chamber disposed along a vertical axis and having an inlet adjacent the lower end thereof and an outlet adjacent the upper end thereof, the chamber further including an oil sump in a lower region thereof, the inlet conduit being disposed adjacent the upper surface of the oil sump;

a plurality of baffles disposed along the vertical axis of the chamber, the baffles each being downwardly sloping and alternately engaging opposite side walls of the chamber, the lowermost baffles directing incoming gas flow onto the surface of the oil sump such that oil vapor and oil droplets are entrained in the gas flow with the particulate, the sizes of the baffles and the spaces therebetween providing a gas flow path of large cross-sectional area with multiple stagnation regions along the flow path;

whereby the entrained oil vapor and droplets wet the surfaces of the baffles along the gas flow path, and particulate entrained in the gas flow impinges upon and is adherent to the oil wetted surfaces, and flows downwardly with the accumulating oil into the oil sump; and a central support member disposed along the vertical axis of the chamber and coupled to each of the baffles, the baffles being unsecured to the chamber side walls such that the central member and the baffles may be removed as a unit;

each of the baffles including a resilient lip registering with and conforming to the side walls of the chamber, such that the baffle is sealed to the side walls of the chamber without restricting removal of the central member and the baffles.

15. The invention as set forth in claim 14 above, wherein the chamber includes at least one viewing port in the region of the oil sump through which the level of the collected oil and particulate may be viewed.

* * * * *